United States Patent
Thomas et al.

(10) Patent No.: US 12,333,374 B1
(45) Date of Patent: *Jun. 17, 2025

(54) FAST FREQUENCY SWITCHING FOR RFID APPLICATIONS

(71) Applicant: Impinj, Inc., Seattle, WA (US)

(72) Inventors: Mike Thomas, Wake Forest, NC (US); Omer Onen, Redmond, WA (US); Joe Tarantino, Seattle, WA (US); Christopher J. Diorio, Shoreline, WA (US)

(73) Assignee: Impinj, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/633,708

(22) Filed: Apr. 12, 2024

Related U.S. Application Data

(63) Continuation of application No. 17/994,048, filed on Nov. 25, 2022, now Pat. No. 11,960,955, which is a continuation of application No. 17/326,806, filed on May 21, 2021, now Pat. No. 11,514,255, which is a continuation of application No. 16/893,489, filed on Jun. 5, 2020, now Pat. No. 11,017,187, which is a continuation of application No. 16/047,243, filed on Jul. 27, 2018, now Pat. No. 10,679,019.

(60) Provisional application No. 62/537,606, filed on Jul. 27, 2017.

(51) Int. Cl.
*G06K 7/10* (2006.01)
*G06K 19/07* (2006.01)

(52) U.S. Cl.
CPC ..... *G06K 7/10158* (2013.01); *G06K 19/0709* (2013.01)

(58) Field of Classification Search
CPC .................. G06K 7/10158; G06K 19/0709
See application file for complete search history.

(56) References Cited

U.S. PATENT DOCUMENTS

| | | | |
|---|---|---|---|
| 9,041,479 | B2 | 5/2015 | Nero, Jr. et al. |
| 2007/0001848 | A1 | 1/2007 | Shanks |
| 2016/0139237 | A1 | 5/2016 | Connolly et al. |
| 2017/0271927 | A1 | 9/2017 | Sakata et al. |

OTHER PUBLICATIONS

Notice of Allowance for Application Number for U.S. Appl. No. 16/047,243 mailed on Feb. 7, 2020, pp. 10.
Office Action for Application Number for U.S. Appl. No. 16/893,489 mailed on Oct. 16, 2020, pp. 15.
Office Action for Application Number for U.S. Appl. No. 17/326,806 mailed on Apr. 28, 2022, pp. 17.

*Primary Examiner* — Laura A Gudorf
(74) *Attorney, Agent, or Firm* — Turk IP Law, LLC

(57) ABSTRACT

RFID readers may be configured to supply power to tags during frequency hops. When a reader is supplying power to a passive RFID tag via a first RF waveform having a first radio frequency and determines that it is to frequency-hop, the reader may determine whether the tag requires power during the hop. If so, the reader begins (or continues) to synthesize a second RF waveform with a second radio frequency while also synthesizing the first RF waveform, and frequency-hops by transitioning from transmitting the first RF waveform to transmitting the second RF waveform such that the power transmitted during the transition is sufficient for the tag to operate.

20 Claims, 10 Drawing Sheets

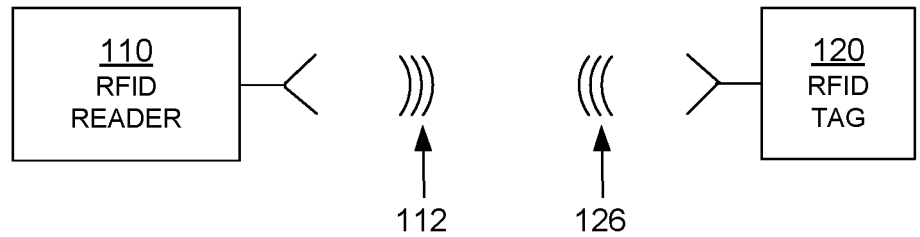
FIG. 1
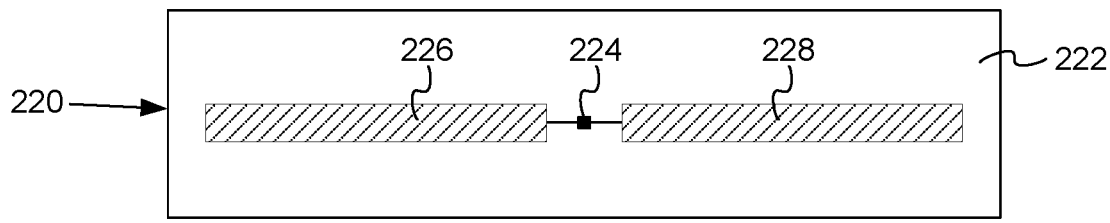
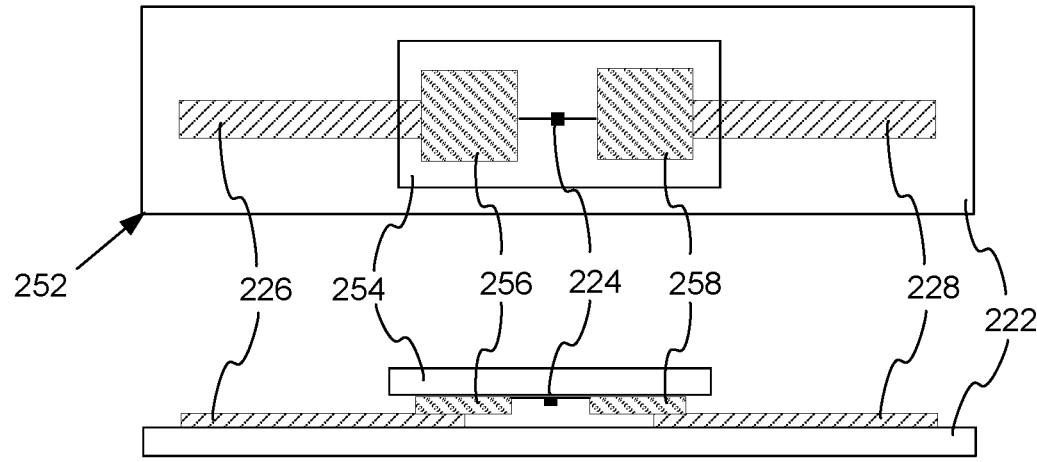
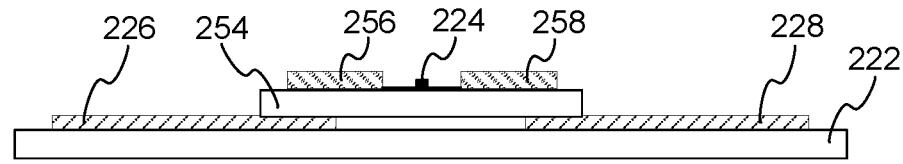
FIG. 2

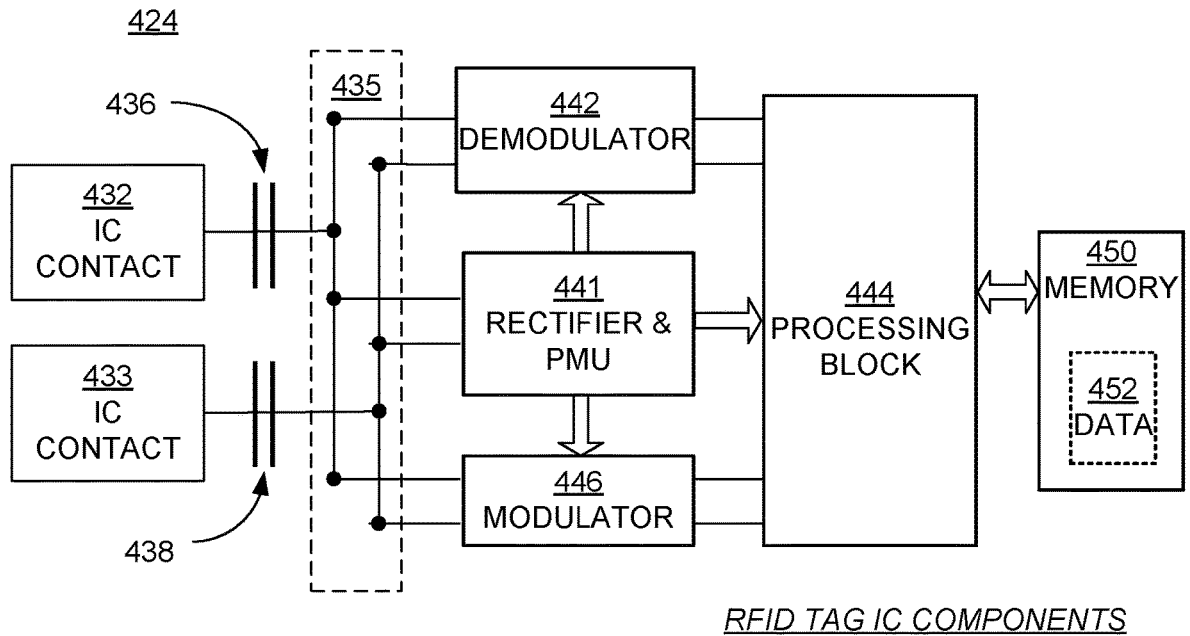
FIG. 4
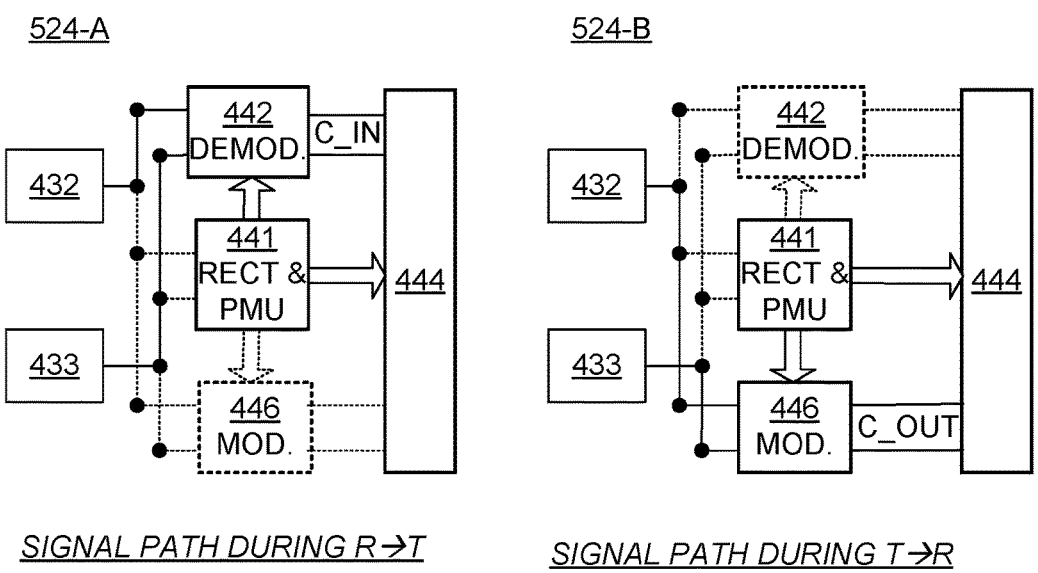
FIG. 5A  FIG. 5B

RFID READER SYSTEM CONFIGURATION WITH OPTIONAL LOCAL AND REMOTE COMPONENTS

FAST FREQUENCY SWITCHING FOR RFID APPLICATIONS

CROSS REFERENCE TO RELATED APPLICATIONS

This application is a continuation of U.S. application Ser. No. 17/994,048 filed on Nov. 25, 2022, which is a continuation of U.S. application Ser. No. 17/326,806, now U.S. Pat. No. 11,514,255, filed on May 21, 2021, which is a continuation of U.S. application Ser. No. 16/893,489, now U.S. Pat. No. 11,017,187, filed on Jun. 5, 2020, which is a continuation of U.S. application Ser. No. 16/047,243, now U.S. Pat. No. 10,679,019, filed on Jul. 27, 2018, which in turn claims the benefit of U.S. Provisional Patent Application Ser. No. 62/537,606 filed on Jul. 27, 2017. The disclosures of the above application are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to inventory one or more RFID tags, where inventorying involves at least singulating a tag and receiving an identifier from the singulated tag. "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. The reader transmitting a Radio-Frequency (RF) wave performs the interrogation. The RF wave is typically electromagnetic, at least in the far field. The RF wave can also be predominantly electric or magnetic in the near or transitional near field. The RF wave may encode one or more commands that instruct the tags to perform one or more actions.

In typical RFID systems, an RFID reader transmits a modulated RF inventory signal (a command), receives a tag reply, and transmits an RF acknowledgement signal responsive to the tag reply. A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

Some RFID systems use frequency hopping spread spectrum (FHSS) for reader-to-tag communications, which involves switching carrier frequencies among several different frequency channels. For example, the Federal Communications Commission (FCC) mandates FHSS for RF system operation in the range of 902-928 MHz, and dictates the distribution of the different frequency channels, frequency switching timing, and other FHSS parameters. Accordingly, RFID readers that operate in regions where FHSS is required should be able to frequency-hop in a manner that complies with the FHSS requirements.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to RFID reader systems switching carrier frequencies when frequency-hopping. When a reader system is supplying power to a passive RFID tag via a first RF waveform having a first radio frequency and determines that it is to frequency-hop, the reader system may determine whether the tag requires power during the hop. If so, the reader system begins (or continues) to synthesize a second RF waveform with a second radio frequency while also synthesizing the first RF waveform, and frequency-hops by transitioning from transmitting the first RF waveform to transmitting the second RF waveform such that the power transmitted during the transition is sufficient for the tag to operate.

According to some examples, a method for an RFID reader that transmits commands to an RFID tag using amplitude modulation (AM) of a radio frequency (RF) waveform to avoid powering-down the RFID tag when changing a frequency of the RF waveform is provided. The method may include transmitting the RF waveform at a first frequency and with a first average power sufficient for the tag to receive a command modulated onto the RF waveform and modulating the RF waveform with a low-amplitude AM pulse whose duration is compatible with the command. The method may further include switching the frequency of the RF waveform to a second frequency different from the first frequency during the low-amplitude pulse and transmitting the RF waveform at the second frequency with a second average power sufficient for the tag to receive the command, at the end of the low-amplitude pulse.

According to other examples, an RFID reader that transmits commands to an RFID tag using amplitude modulation (AM) of a radio frequency (RF) waveform and is configured to avoid powering-down the RFID tag when changing a frequency of the RF waveform is provided. The reader includes a transceiver configured to transmit RF waveforms and a processor coupled to the transceiver. The processor may be configured to amplitude-modulate the RF waveform with a command, where the modulation includes a low-amplitude pulse whose duration is compatible with the command, and cause the transceiver to transmit the modulated RF waveform at a first frequency and with a first average power sufficient for the tag to receive the command. The processor may be further configured to switch the frequency of the RF waveform from the first frequency to a second frequency different from the first frequency during the low-amplitude pulse and cause the transceiver to transmit the RF waveform at the second frequency with a second average power sufficient for the tag to receive the command, at the end of the pulse.

According to further examples, a method for an RFID reader that transmits commands to an RFID tag using amplitude modulation of an RF waveform to avoid powering-down the RFID tag when changing a frequency of the RF waveform is provided. The method may include transmitting an RF waveform at a first frequency, where the RF waveform is amplitude-modulated with a command, and identifying a modulated portion of the RF waveform whose amplitude and duration are suitable for frequency switching. The method may further include switching the frequency of the RF waveform to a second frequency different from the first frequency during the identified modulated portion and transmitting the RF waveform at the second frequency, where an average power of the entire modulated RF waveform is sufficient for the tag to receive the command.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 1 is a block diagram of components of an RFID system.

FIG. 2 is a diagram showing components of a passive RFID tag, such as a tag that can be used in the system of FIG. 1.

FIG. 4 is a block diagram showing a detail of an RFID tag, such as the one shown in FIG. 2.

FIGS. 5A and 5B illustrate signal paths during tag-to-reader and reader-to-tag communications in the block diagram of FIG. 4.

DETAILED DESCRIPTION

Figure 3:
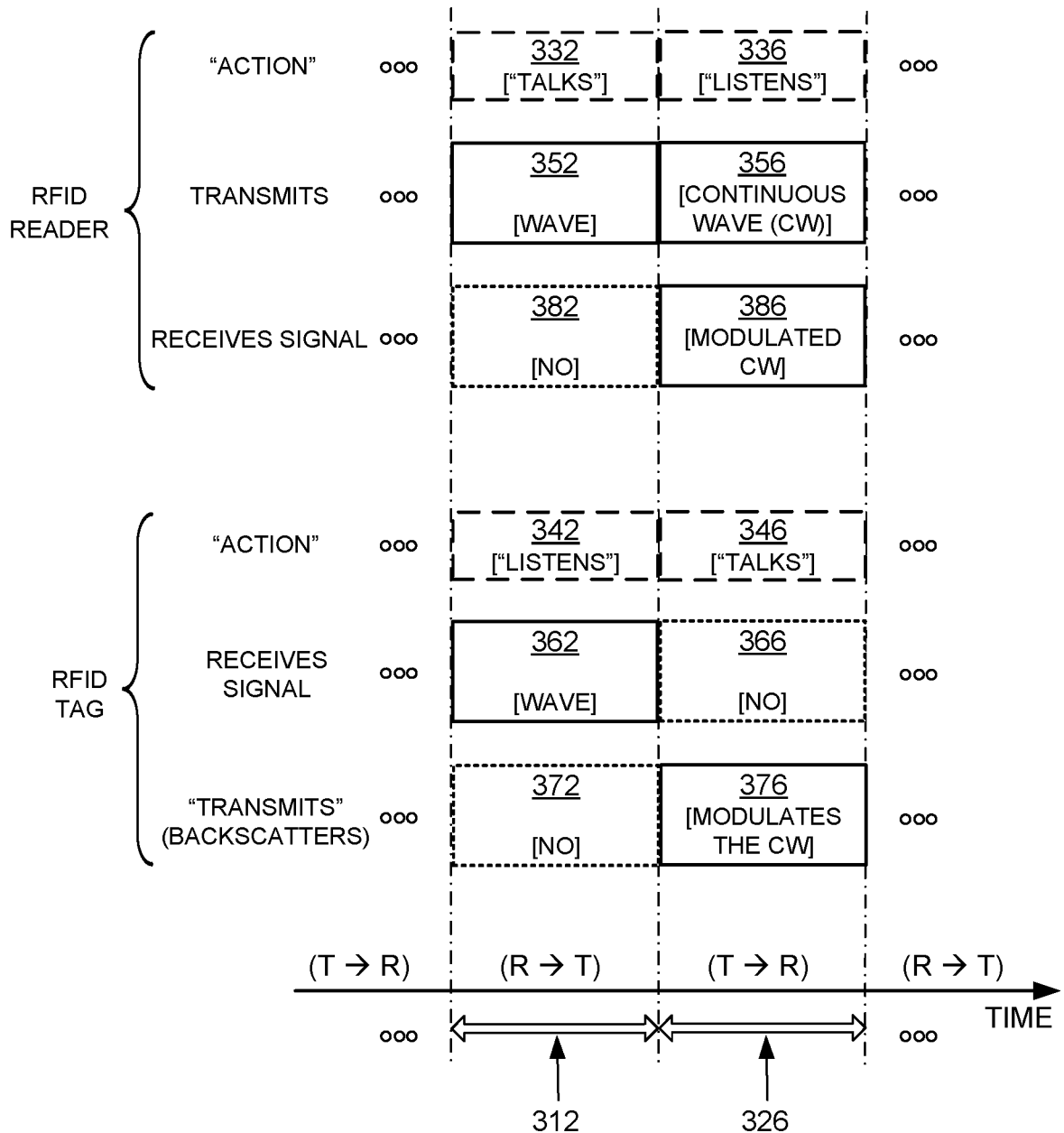
FIG. 3 is a conceptual diagram for explaining a half-duplex mode of communication between the components of the RFID system of FIG. 1.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art, and may be volatile or not. Some portions of memory may be writeable and some not. "Command" refers to a reader request for one or more tags to perform one or more actions, and includes one or more tag instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Specification"), versions 1.2.0 and 2.0 of which are hereby incorporated by reference.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals).

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHZ, 13.56 MHZ, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor fieldeffect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the term "electrically isolated" as used herein means that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which may both harvest power and respond if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance. If IC 224 is capable of transmitting signals (e.g., has its own power source, is coupled to an external power source, and/or is able to harvest sufficient power to transmit signals), then IC 224 may respond by transmitting response signal 126.

In the embodiments of FIG. 2, antenna segments 226 and 228 are separate from IC 224. The antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

An RFID tag such as tag 220 is often attached to or associated with an individual item or the item packaging. An RFID tag may be fabricated and then attached to the item or packaging, or may be partly fabricated before attachment to the item or packaging and then completely fabricated upon attachment to the item or packaging. In some embodiments, the manufacturing process of the item or packaging may include the fabrication of an RFID tag. In these embodiments, the resulting RFID tag may be integrated into the item or packaging, and portions of the item or packaging may serve as tag components. For example, conductive item or packaging portions may serve as tag antenna segments or contacts. Nonconductive item or packaging portions may serve as tag substrates or inlays. If the item or packaging includes integrated circuits or other circuitry, some portion of the circuitry may be configured to operate as part or all of an RFID tag IC.

The components of the RFID system of FIG. 1 may communicate with each other in any number of modes. One such mode is called full duplex, where both reader 110 and tag 120 can transmit at the same time. In some embodiments, RFID system 100 may be capable of full duplex communication if tag 120 is configured to transmit signals as described above. Another such mode, suitable for passive tags, is called half-duplex, and is described below.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Interval 312 may typically be of a different duration than interval 326-here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG.

1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two IC contacts 432, 433, suitable for coupling to antenna segments such as antenna segments 226/228 of RFID tag 220 of FIG. 2. When two IC contacts form the signal input from and signal return to an antenna they are often referred-to as an antenna port. IC contacts 432, 433 may be made in any suitable way, such as from metallic pads and so on. In some embodiments circuit 424 uses more than two IC contacts, especially when tag 220 has more than one antenna port and/or more than one antenna.

Circuit 424 includes signal-routing section 435 which may include signal wiring, signal-routing busses, receive/transmit switches, and so on that can route a signal to the components of circuit 424. In some embodiments IC contacts 432/433 couple galvanically and/or inductively to signal-routing section 435. In other embodiments (such as is shown in FIG. 4) circuit 424 includes optional capacitors 436 and/or 438 which, if present, capacitively couple IC contacts 432/433 to signal-routing section 435. This capacitive coupling causes IC contacts 432/433 to be galvanically decoupled from signal-routing section 435 and other circuit components.

Capacitive coupling (and resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In this situation, capacitors 436 and/or 438 galvanically decouple IC contact 432 from IC contact 433, thereby preventing the formation of a short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 also includes a rectifier and PMU (Power Management Unit) 441 that harvests energy from the RF signal received by antenna segments 226/228 to power the circuits of IC 424 during either or both reader-to-tag (R→T) and tag-to-reader (T→R) sessions. Rectifier and PMU 441 may be implemented in any way known in the art.

Circuit 424 additionally includes a demodulator 442 that demodulates the RF signal received via IC contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving IC contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a Nonvolatile Memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

FIG. 5A shows version 524-A of components of circuit 424 of FIG. 4, further modified to emphasize a signal operation during a R→T session during time interval 312 of FIG. 3. Demodulator 442 demodulates an RF signal received from IC contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226/228 of RFID tag 220 via IC contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Specification mentioned above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications. In addition, a protocol can be a variant of a stated specification such as the Gen2 Specification, for example including fewer or additional commands than the stated specification calls for, and so on. In such instances, additional commands are sometimes called custom commands.

Figure 6:
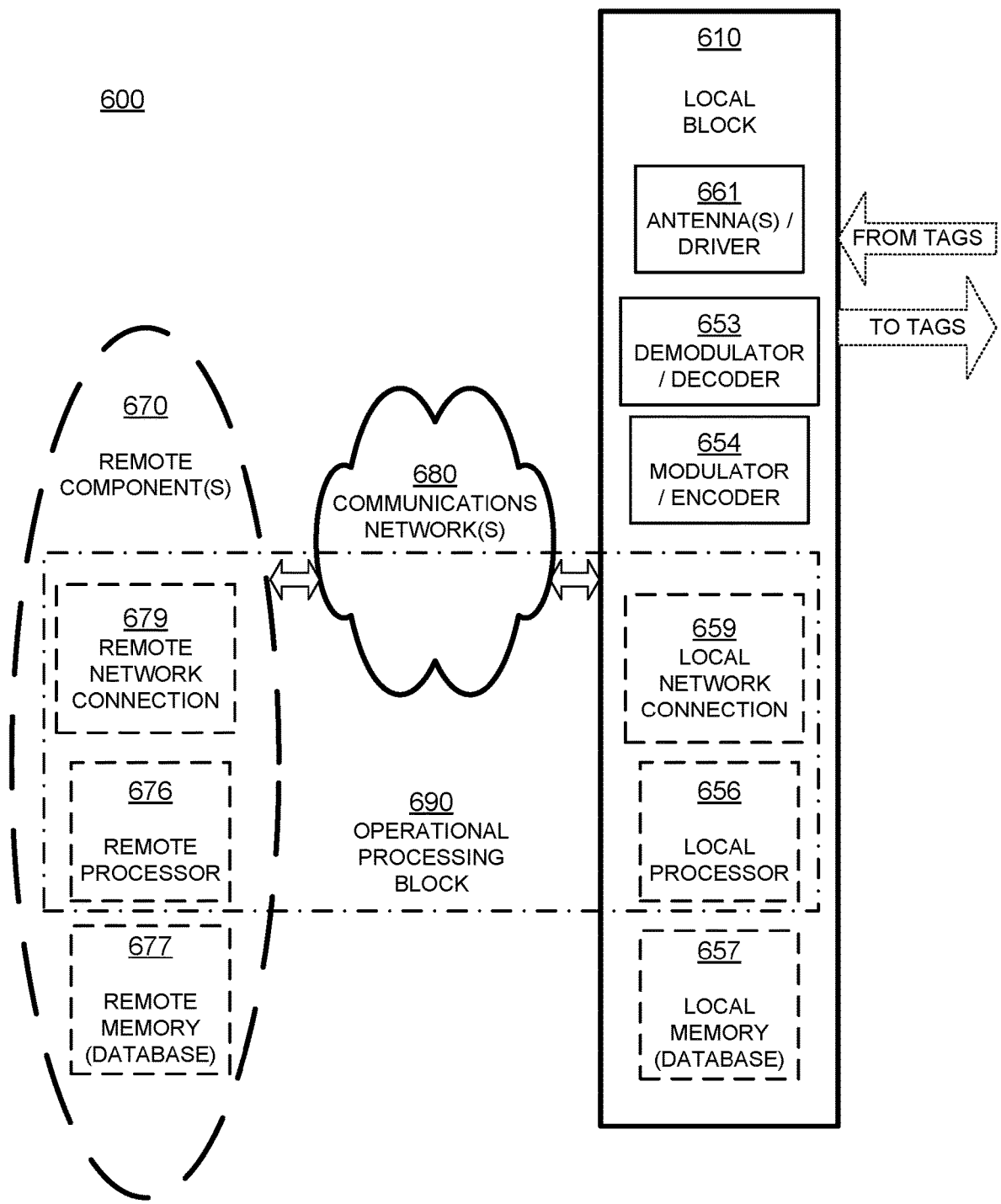
FIG. 6 is a block diagram showing a detail of an RFID reader system, such as the one shown in FIG. 1.

FIG. 6 is a block diagram of an RFID reader system 600 according to embodiments. RFID reader system 600 includes a local block 610, and optionally remote components 670. Local block 610 and remote components 670 can be implemented in any number of ways. For example, local block 610 or portions of local block 610 may be implemented as a standalone device or as a component in another device. In some embodiments, local block 610 or portions of local block 610 may be implemented as a mobile device, such as a handheld RFID reader, or as a component in a mobile device, such as a laptop, tablet, smartphone, wearable device, or any other suitable mobile device. It will be recognized that RFID reader 110 of FIG. 1 is the same as local block 610, if remote components 670 are not provided. Alternately, RFID reader 110 can be implemented instead by RFID reader system 600, of which only the local block 610 is shown in FIG. 1.

In some embodiments, one or more of the blocks or components of reader system 600 may be implemented as integrated circuits. For example, local block 610, one or more of the components of local block 610, and/or one or more of the remote component 670 may be implemented as integrated circuits using CMOS technology, BJT technology, MESFET technology, and/or any other suitable implementation technology.

Local block 610 is responsible for communicating with RFID tags. Local block 610 includes a block 651 of an antenna and a driver of the antenna for communicating with the tags. Some readers, like that shown in local block 610, contain a single antenna and driver. Some readers contain multiple antennas and drivers and a method to switch signals among them, including sometimes using different antennas for transmitting and for receiving. Some readers contain multiple antennas and drivers that can operate simultaneously. In some embodiments, block 651 may be a phased-array antenna or synthesized-beam antenna (SBA), and local block 610 may be implemented in a synthesized-beam reader (SBR) configured to generate one or more beams via the SBA. A demodulator/decoder block 653 demodulates and decodes backscattered waves received from the tags via antenna/driver block 651. Modulator/encoder block 654 encodes and modulates an RF wave that is to be transmitted to the tags via antenna/driver block 651.

Local block 610 additionally includes an optional local processor 656. Local processor 656 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 653, the encoding function in block 654, or both, may be performed instead by local processor 656. In some cases, local processor 656 may implement an encryption or authentication function; in some cases, one or more of these functions can be distributed among other blocks such as encoding block 654, or may be entirely incorporated in another block.

Local block 610 additionally includes an optional local memory 657. Local memory 657 may be implemented in any number of ways known in the art, including, by way of example and not of limitation, any of the memory types described above as well as any combination thereof. Local memory 657 can be implemented separately from local processor 656, or in an IC with local processor 656, with or without other components. Local memory 657, if provided, can store programs for local processor 656 to run, if needed.

In some embodiments, local memory 657 stores data read from tags, or data to be written to tags, such as Electronic Product Codes (EPCs), Tag Identifiers (TIDs) and other data. Local memory 657 can also include reference data that is to be compared to EPCs, instructions and/or rules for how to encode commands for the tags, modes for controlling antenna 651, encryption/authentication algorithms, algorithms for tracking tag location or movement, secret keys, key pairs, individual public and/or private keys, electronic signatures, and so on. In some of these embodiments, local memory 657 is provided as a database.

Some components of local block 610 typically treat the data as analog, such as the antenna/driver block 651. Other components such as local memory 657 typically treat the data as digital. At some point, there is a conversion between analog and digital. Based on where this conversion occurs, a reader may be characterized as "analog" or "digital", but most readers contain a mix of analog and digital functionality.

If remote components 670 are provided, they are coupled to local block 610 via an electronic communications network 680. Network 680 can be a Local Area Network (LAN), a Metropolitan Area Network (MAN), a Wide Area Network (WAN), a network of networks such as the internet, or a local communication link, such as a USB, PCI, and so on. Local block 610 may include a local network connection 659 for communicating with communications network 680 or may couple to a separate device or component configured to communicate with communications network 680. Communications on the network can be secure, such as if they are encrypted or physically protected, or insecure if they are not encrypted or otherwise protected.

There can be one or more remote component(s) 670. If more than one, they can be located at the same location, or in different locations. They may communicate with each other and local block 610 via communications network 680, or via other similar networks, and so on. Accordingly, remote component(s) 670 can use respective remote network connections. Only one such remote network connection 679 is shown, which is similar to local network connection 659, etc.

Remote component(s) 670 can also include a remote processor 676. Remote processor 676 can be made in any way known in the art, such as was described with reference to local processor 656. Remote processor 676 may also implement an encryption/authentication function and/or a tag location/tracking function, similar to local processor 656.

Remote component(s) 670 can also include a remote memory 677. Remote memory 677 can be made in any way known in the art, such as was described with reference to local memory 657. Remote memory 677 may include a local database, and a different database of a standards organization, such as one that can reference EPCs. Remote memory 677 may also contain information associated with commands, tag profiles, keys, or the like, similar to local memory 657.

One or more of the above-described elements may be combined and designated as operational processing block 690. Operational processing block 690 includes those components that are provided of the following: local processor 656, remote processor 676, local network connection 659, remote network connection 679, and by extension an applicable portion of communications network 680 that links remote network connection 679 with local network connection 659. The portion can be dynamically changeable, etc. In addition, operational processing block 690 can receive and decode RF waves received via antenna/driver 651, and cause antenna/driver 651 to transmit RF waves according to what it has processed.

Operational processing block 690 includes either local processor 656, or remote processor 676, or both. If both are provided, remote processor 676 can be made such that it operates in a way complementary with that of local processor 656. In fact, the two can cooperate. It will be appreciated that operational processing block 690, as defined this way, is in communication with both local memory 657 and remote memory 677, if both are present.

Accordingly, operational processing block 690 is location independent, in that its functions can be implemented either by local processor 656, or by remote processor 676, or by a combination of both. Some of these functions are preferably implemented by local processor 656, and some by remote processor 676. Operational processing block 690 accesses local memory 657, or remote memory 677, or both for storing and/or retrieving data.

RFID reader system 600 operates by operational processing block 690 generating communications for RFID tags. These communications are ultimately transmitted by antenna/driver block 651, with modulator/encoder block 654 encoding and modulating the information on an RF wave. Then data is received from the tags via antenna/driver block 651, demodulated and decoded by demodulator/decoder block 653, and processed by operational processing block 690.

Embodiments of an RFID reader system can be implemented as hardware, software, firmware, or any combination. Such a system may be subdivided into components or modules. Some of these components or modules can be implemented as hardware, some as software, some as firmware, and some as a combination. An example of such a subdivision is now described, together with the RFID tag as an additional module.

Figure 7:
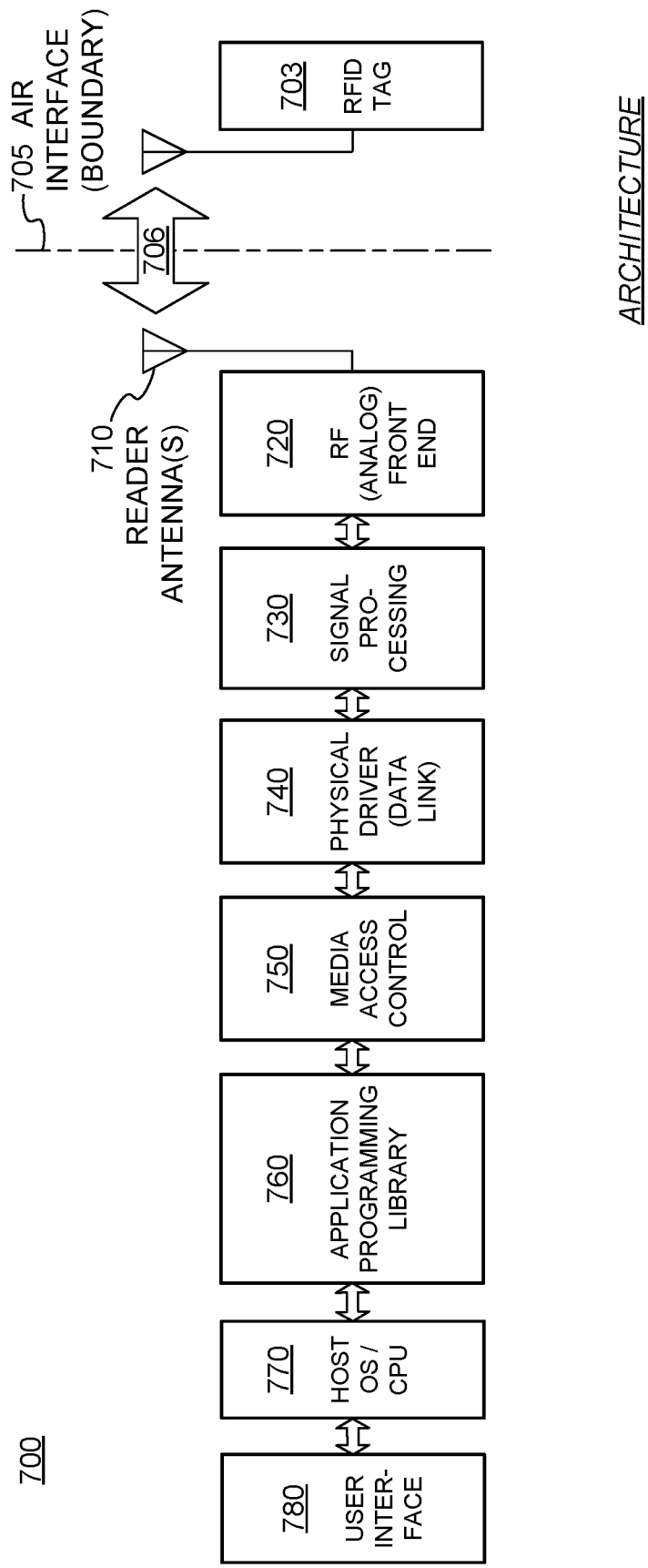
FIG. 7 is a block diagram illustrating an overall architecture of an RFID system according to embodiments.

FIG. 7 is a block diagram illustrating an overall architecture of an RFID system 700 according to embodiments. RFID system 700 may be subdivided into modules or components, each of which may be implemented by itself or in combination with others. In addition, some of them may be present more than once. Other embodiments may be equivalently subdivided into different modules. Some aspects of FIG. 7 are parallel with systems, modules, and components described previously.

An RFID tag 703 is considered here as a module by itself. RFID tag 703 conducts a wireless communication 706 with the remainder, via the air interface 705. Air interface 705 is really a boundary, in that signals or data that pass through it are not intended to be transformed from one thing to another. Specifications as to how readers and tags are to communicate with each other, for example the Gen2 Specification, also properly characterize that boundary as an interface.

RFID system 700 includes one or more reader antennas 710, and an RF front-end module 720 for interfacing with reader antenna(s) 710. These can be made as described above.

RFID system 700 also includes a signal-processing module 730. In one embodiment, signal-processing module 730 exchanges waveforms with RF front-end module 720, such as I and Q waveform pairs.

RFID system 700 further includes a physical-driver module 740, which is also known as a data-link module. In some embodiments, physical-driver module 740 exchanges bits with signal-processing module 730. Physical-driver module 740 can be the stage associated with the framing of data.

RFID system 700 additionally includes a media access control module 750. In one embodiment, media access control layer module 750 exchanges packets of bits with physical driver module 740. Media access control layer module 750 can make decisions for sharing the medium of wireless communication, which in this case is the air interface.

RFID system 700 moreover includes an application-programming library-module 760. This module 760 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 770. In some embodiments, the processor is not considered as a separate module, but one that includes some of the above-mentioned modules of RFID system 700. In some embodiments, the one or more processors may perform operations associated with retrieving data that may include a tag public key, an electronic signature, a tag identifier, an item identifier, and/or a signing-authority public key. In some embodiments, the one or more processors may verify an electronic signature, create a tag challenge, and/or verify a tag response.

User interface module 780 may be coupled to application-programming-library module 760, for accessing the APIs. User interface module 780 can be manual, automatic, or both. It can be supported by the host OS/CPU module 770 mentioned above, or by a separate processor, etc.

It will be observed that the modules of RFID system 700 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other direction for transmitting RFID waveforms. In receiving mode, reader antenna(s) 710 receives wireless waves, which are in turn processed successively by the various modules in the chain. Processing can terminate in any one of the modules. In transmitting mode, waveform initiation can be in any one of the modules. Ultimately, signals are routed to reader antenna(s) 710 to be transmitted as wireless waves.

The architecture of RFID system 700 is presented for purposes of explanation, and not of limitation. Its particular, subdivision into modules need not be followed for creating embodiments. Furthermore, the features of the present disclosure can be performed either within a single one of the modules, or by a combination of them. In some embodiments RFID system 700 can be incorporated into another electronic device such as a checkout terminal in a store or a consumer device such as a mobile phone.

As mentioned previously, embodiments are directed to fast frequency switching in RFID readers. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions, data, keys, signatures, and other data of a program made according to the embodiments. A storage medium according to the embodiments is a computer-readable medium, such as a memory, and is read by a processor of the type mentioned above. If a memory, it can be implemented in any of the ways and using any of the technologies described above.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

RFID readers may be configured to perform frequency hopping, especially in regions where FHSS is mandated. In one implementation, a reader performing a frequency hop first halts signal transmission, then adjusts its local oscillator to a new frequency corresponding to a new carrier frequency. The reader may wait for some time after oscillator adjustment before retransmitting at the new carrier frequency to allow the oscillator to settle at the new frequency and avoid transmitting signals with spectral noise caused by the oscillator adjustment. Once the oscillator has settled, the reader may then begin to transmit a signal with the new carrier frequency.

The gap in reader signal transmission due to the oscillator settling time, if sufficiently long, may cause passive tags that harvest power from the reader signal to temporarily lose power and power-down. If a tag is performing some long and/or power-intensive operation, such as a write to memory, a sensor measurement, or some other power-intensive computation, power loss may cause the operation to fail. Similarly, if a tag is performing some operation based on state information stored in volatile memory (e.g., a cryptographic operation), power loss may cause state information loss, in turn causing the operation to fail irrecoverably and necessitating that the operation be restarted.

Figure 8:
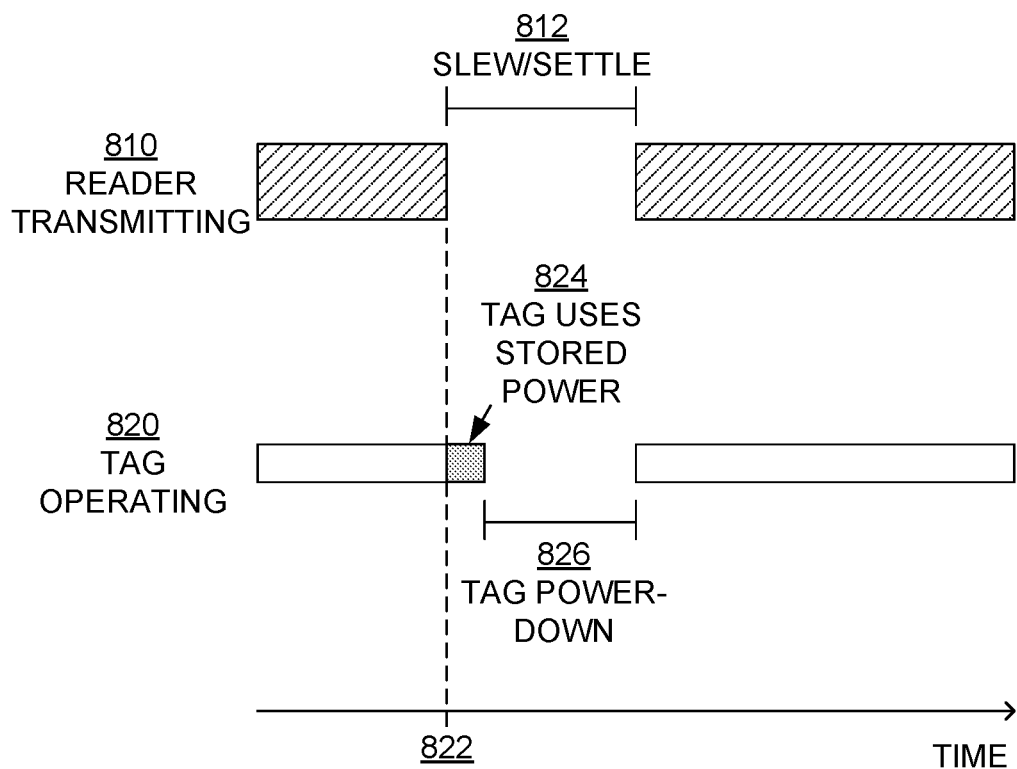
FIG. 8 depicts RFID tag power loss during transmission frequency transitions.

FIG. 8 depicts RFID tag power loss during transmission frequency transitions. Diagram 800 depicts reader signal transmission 810 and passive tag operation 820 over time, as indicated by the time axis. At time 822, the reader performs a frequency hop by stopping signal transmission and adjusting its oscillator to a new frequency. The reader then waits for a slew/settle time duration 812 to allow the oscillator to settle at the new frequency. After waiting for time duration 812, the reader begins transmitting at a new carrier frequency, based on the new oscillator frequency.

The passive tag operates by harvesting power from a signal from the reader. When the reader stops transmitting, the tag cannot harvest sufficient power for operation, and therefore at time 822 the tag either loses power, powers-down, and halts operation, or begins operating based on stored energy (824). Even if the tag has energy storage, it may not be sufficient to power the tag for the entirety of slew/settle time duration 812, and the tag will lose power and power-down for time duration 826, also causing state loss.

Figure 9:
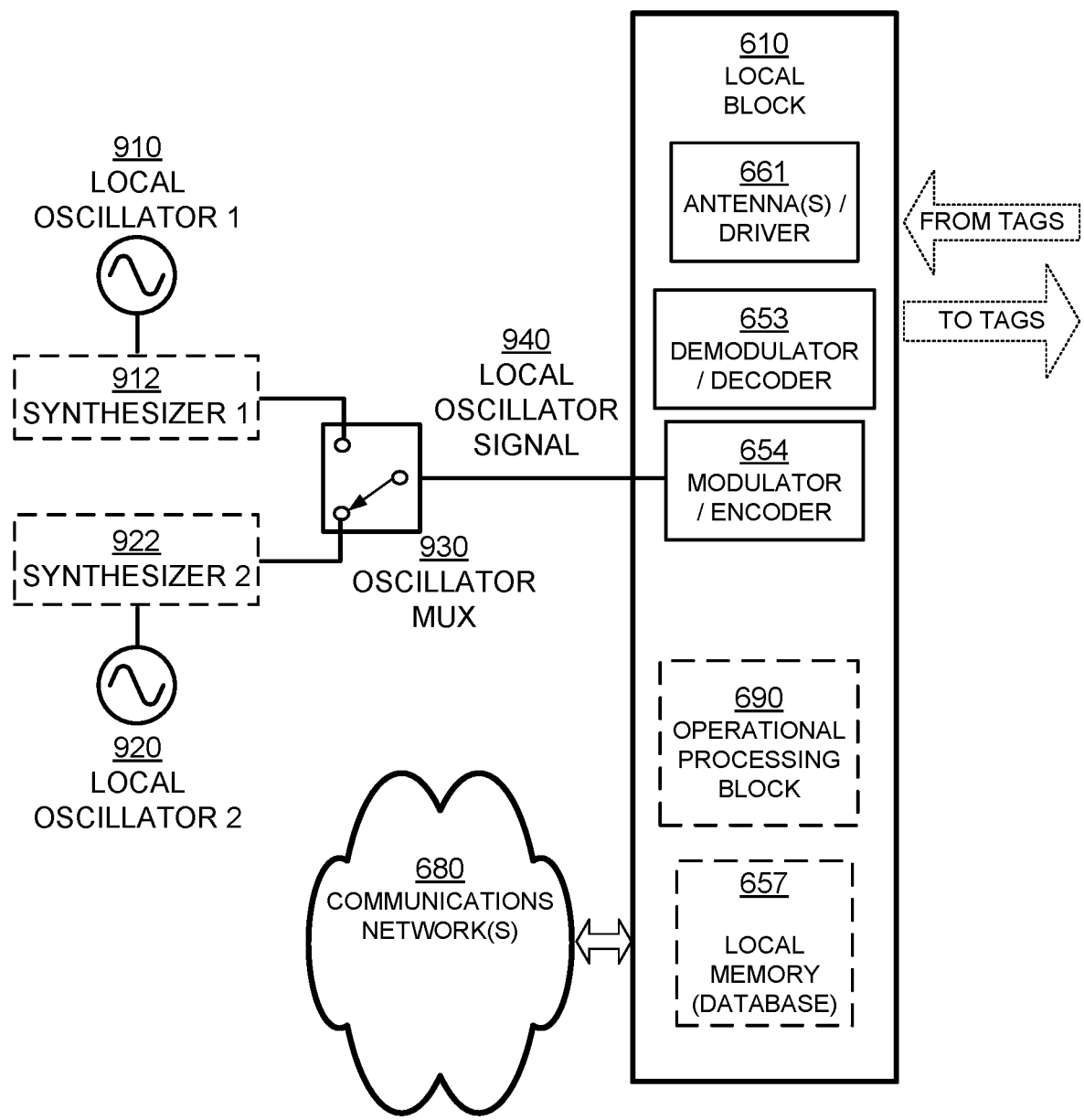
FIG. 9 is a block diagram showing an example multi-oscillator RFID reader system configured for fast frequency switching, according to embodiments.

One way to avoid powering-down tags during frequency hops is to accelerate the frequency transition process, such that the average power supplied to a tag over a time duration including the frequency hop is sufficient for the tag to receive and process commands or otherwise operate without powering-down. Frequency transitions can be accelerated by, for example, simultaneously generating multiple frequencies or by adjusting the transition process itself. As an example of the former, FIG. 9 is a block diagram showing an example multi-oscillator RFID reader system 900 configured for fast frequency switching, according to embodiments. RFID reader system 900, which may be similar to system 600 in FIG. 6, includes two local oscillators 910 and 920, which in some embodiments may be implemented using voltage-controlled oscillators. Local oscillators 910 and 920 may be coupled to respective optional synthesizers 912/922 (for example, implemented using phase-locked loop circuits) and then to oscillator multiplexer 930. Multiplexer 930 in turn selects one of the oscillator/synthesizer signals to provide to modulator/encoder 654 as local oscillator signal 940. Modulator/encoder 654 then generates a reader carrier signal with a carrier frequency based on the frequency of signal 940. Local oscillators 910/920, optional synthesizers 912/922, and oscillator multiplexer 930 may be controlled by operational processing block 690, described above in FIG. 6.

Reader system 900 is configured for fast frequency switching by switching between local oscillators 910 and 920 (via oscillator multiplexer 930) when performing frequency hops. Suppose that oscillator multiplexer 930 is initially configured to provide a signal from local oscillator 910, set at a first frequency, as local oscillator signal 940. At some point before the next frequency hop, reader system 900 sets local oscillator 920 to a second frequency different from the first frequency and allows local oscillator 920 to settle at the second frequency. When reader system 900 determines that the next frequency hop is to be performed, it can immediately cause oscillator multiplexer 930 to switch from providing the signal from local oscillator 910 as local oscillator signal 940 to providing a signal from the now-settled local oscillator 920 as local oscillator signal 940. As a result, reader system 900 can switch from transmitting an RF waveform based on the first frequency to an RF waveform based on the second frequency without having to wait for local oscillator 920 to settle. For subsequent frequency hops, reader system 900 can alternately adjust local oscillators 910 and 920 to different frequencies.

Figure 10:
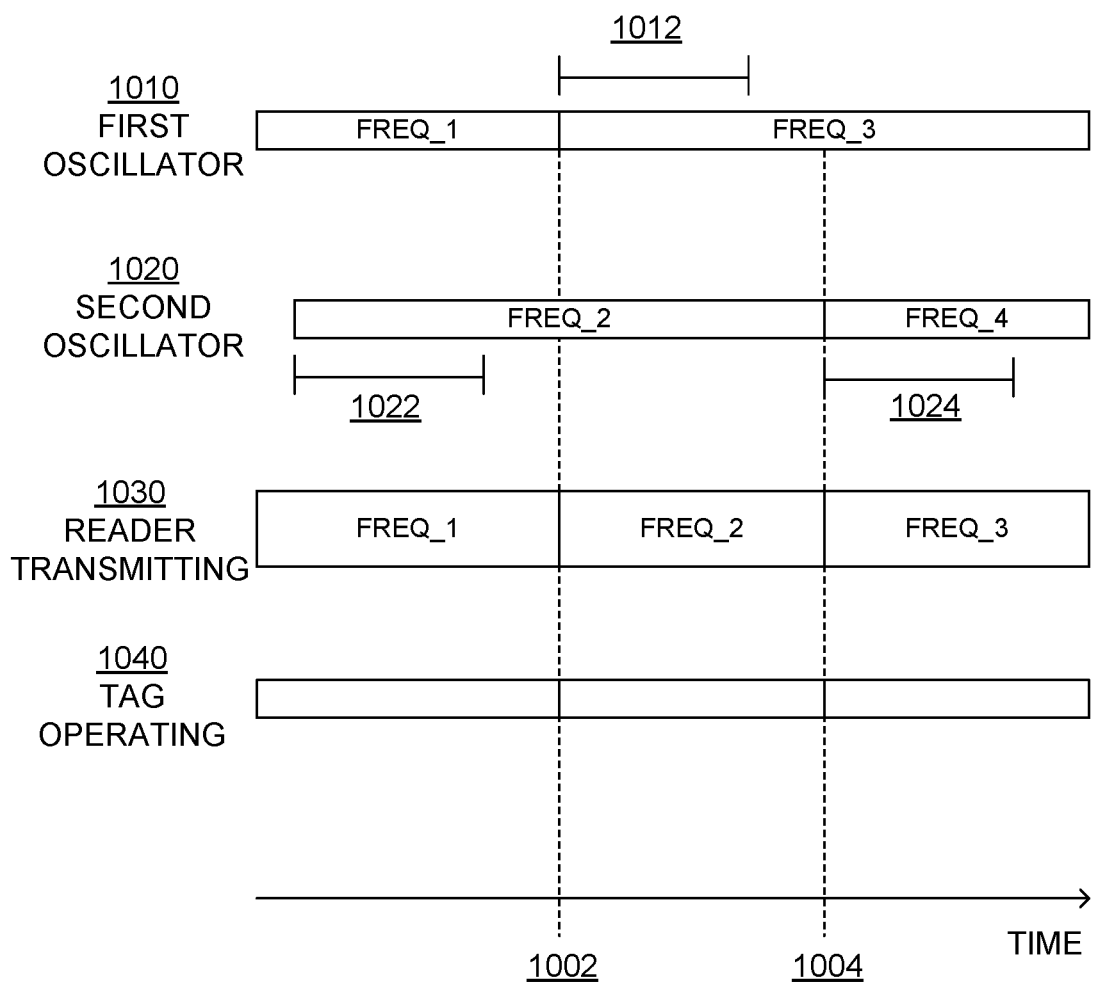
FIG. 10 depicts an example of fast frequency switching during transmission frequency transitions, according to embodiments.

FIG. 10 depicts an example of fast frequency switching during transmission frequency transitions, according to embodiments. Diagram 1000 depicts reader signal transmission 1030 and passive tag operation 1040 over time, as indicated by the time axis. Prior to a first frequency hop at time 1002, first oscillator 1010 is set at, and the reader transmits an RF waveform with a first carrier frequency based on, frequency FREQ_1. The reader transmits the first-carrier-frequency RF waveform with average power sufficient for the tag to receive commands, process commands, or otherwise operate. The reader also sets second oscillator 1020 to frequency FREQ_2 such that settling time 1022 for second oscillator 1020 completes before time 1002. At time 1002, the reader stops transmitting the first-carrier-frequency RF waveform and immediately begins transmitting the RF waveform with a second carrier frequency based on FREQ_2 from second oscillator 1020 such that tag operation 1040 is not substantially interrupted. For example, the reader may transmit the second-carrier-frequency RF waveform with sufficient power for the tag to receive commands, process commands, or otherwise operate. In some embodiments, the reader may transmit the combination of the first-carrier-frequency RF waveform and the second-carrier-frequency RF waveform with average power (measured over a time duration including the frequency transition) sufficient for the tag to receive commands, process commands, or otherwise operate without interruption due to the frequency transition.

In preparation for a second frequency hop at time 1004, the reader adjusts first oscillator 1010 from frequency FREQ_1 to frequency FREQ_3 such that settling time 1012 for first oscillator 1010 completes before time 1004. At time 1004, the reader switches from transmitting the second-carrier-frequency RF waveform to transmitting the RF waveform with a third carrier frequency based on FREQ_3, again without substantially interrupting tag operation 1040. In preparation for the next frequency hop, the reader also adjusts second oscillator 1020 from FREQ_2 to FREQ_4 at time 1004. By allowing another oscillator to settle at a new frequency before a frequency hop, the reader can perform the frequency hop without significantly interrupting signal transmission, thereby preventing tag power loss.

While in diagram 1000 the reader begins to transmit the RF waveform with a new frequency immediately after ceasing to transmit the RF waveform with the previous frequency, in some embodiments the reader may reader may pause or delay momentarily after ceasing to transmit the previous-frequency RF waveform before beginning to transmit the new-frequency RF waveform. The pause or delay may be of any duration, as long as the average power supplied to the tag in the time duration including the pause or delay is sufficient for the tag to continue receiving commands, processing commands, operate, and/or avoid powering-down. In some embodiments, the tag may be configured to enter a "hold" state during the frequency transition, where the tag is not entirely powered-down but maintains some reduced functionality at reduced power. In the hold state, the tag may temporarily pause or slow power-intensive computations, or may devote power to state information storage in volatile memory.

In FIGS. 9 and 10, the reader system accelerates frequency transitions by alternating between two oscillators set to different frequencies. In some embodiments, fast-frequency-switching reader systems may switch between more than two different oscillators. In other embodiments, a reader system configured for fast frequency switching may generate n+1 radio frequencies with fewer than n+1 oscillators, or even with a single oscillator. For example, a reader system with a direct digital frequency synthesizer (DDFS) coupled to a frequency reference oscillator may be able to digitally (e.g., via an input into a numerically-controlled oscillator) switch between different frequencies without significant settling time. In these embodiments, the reader system may further include a subsequent filter (e.g., a reconstruction lowpass filter) to reject noise. In some embodiments, a reader system may generate multiple radio frequencies by using a comb filter to recover desired radio frequency components from a signal and selecting between the recovered radio frequency components. Of course, any other means to generate multiple radio frequencies, simultaneously or not, may be used for fast frequency switching as described herein.

In some embodiments, instead of (or in addition to) using multiple oscillators, frequency transitions can also be accelerated by adjusting the transition process itself. When a phase-locked loop (PLL) circuit provides the frequency signal, PLL operation can be adjusted to accelerate frequency transitions. As one example, the time it takes for a PLL circuit to lock on to a new frequency during a frequency transition can be decreased by increasing the PLL bandwidth. This can be done adaptively, such as when the reader system determines a frequency hop is imminent. After the frequency transition, the PLL bandwidth can be decreased for normal operation. As another example, the voltage-controlled oscillator (VCO) in the PLL circuit can be pretuned (i.e., tuned before the actual frequency transition) to reduce overall frequency transition time. The VCO may be pretuned by opening the feedback loop of the PLL circuit, tuning the VCO to a new value using some other input, and then closing the PLL feedback loop during the frequency transition.

Other feedback loop adjustment techniques may be used to accelerate frequency transitions. For example, a PLL circuit may be configured to avoid loop saturation and reduce settling time by incrementing quickly through a series of small frequency transitions, or by transitioning to new frequencies linearly. Of course, any other VCO, PLL, or feedback loop adjustments for reducing frequency transition time can be used.

In some embodiments, reader systems may reduce the likelihood of tag operation failure due to insufficient power from frequency hops by appropriate scheduling. Transition time between two different frequencies is directly related to the difference between the two frequencies. For example, transitioning between two relatively similar frequencies is faster than transitioning between two relatively different frequencies. If a reader system knows the frequencies and sequence in which it is to hop to those frequencies (i.e., as specified in a predetermined or reader system-generated frequency hop table), then the reader system can schedule lengthy or power-intensive tag operations to occur during hops of relatively short duration between relatively similar frequencies, thereby reducing the likelihood that the tag operations will fail due to insufficient power. In embodiments with reader system-generated frequency hop tables, the reader system may attempt to generate the frequency hop table to increase the number of adjacent-frequency hops while still adhering to frequency-hopping requirements. Regardless of whether the hops are set in advance or determined by the reader system, the hop schedule and frequencies may satisfy a frequency-hopping spread-spectrum radio regulation dictated by a regulatory agency, such as the FCC or the European Telecommunications Standards Institute (ETSI).

Fast frequency switching may introduce high-frequency noise into the carrier waveform (sometimes known as frequency/spectral splatter or switch noise) if performed indiscriminately. Accordingly, a reader capable of fast frequency switching may be configured to time frequency switching to reduce noise due to the frequency transition.

Figure 11:
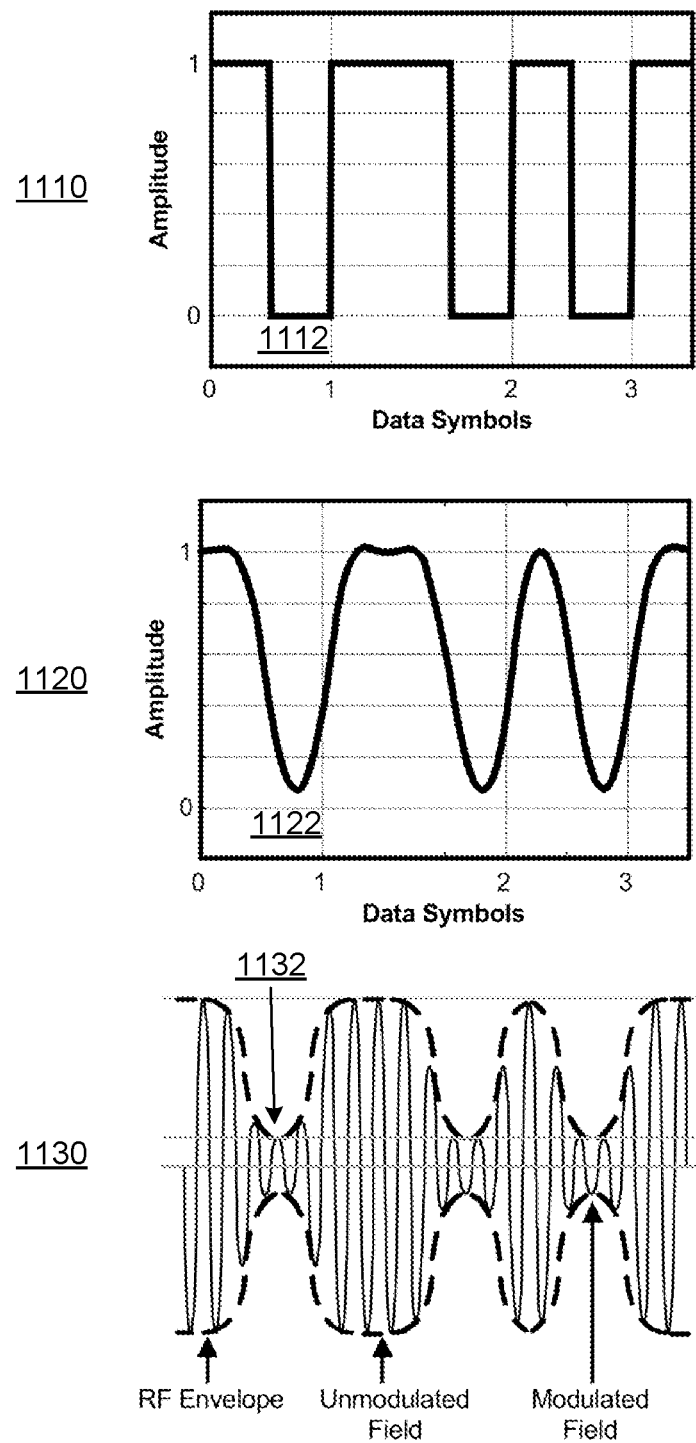
FIG. 11 illustrates how fast frequency switching can be timed to reduce noise, according to embodiments.

FIG. 11 illustrates how fast frequency switching can be timed to reduce noise, according to embodiments. FIG. 11 depicts example baseband, modulating, and modulated waveforms at an RFID reader, and are similar to the waveforms described in Annex H of the Gen2 Specification. Waveform 1110 is an example sequence of three data symbols 0, 1, and 0 as described in section 6.3.1.2.3 of the Gen2 Specification. Each of the data symbols includes a low-amplitude pulse or portion. The example data sequence is then converted into a double-sideband (DSB) or single-sideband (SSB) amplitude-shift keying (ASK) modulating waveform 1120. The modulating waveform 1120 is then used to amplitude-modulate an RF carrier waveform to generate an amplitude-modulated waveform 1130 for transmission to RFID tags.

A reader capable of fast frequency switching may be configured to time frequency transitions when the amplitude of the transmitted, amplitude-modulated RF waveform is relatively low. A low-amplitude portion of an amplitude-modulated RF waveform may have a modulation depth of between 30% and 100%, where "modulation depth" is a ratio of the difference between the maximum waveform amplitude and the amplitude of the low-amplitude portion and the maximum waveform amplitude. For example, a low-amplitude waveform portion with a modulation depth of 50% has an amplitude that is half the maximum waveform amplitude, and a low-amplitude waveform portion with a modulation depth of 90% has an amplitude that is a tenth of the maximum waveform amplitude. In some embodiments, the reader may time frequency transitions during low-amplitude portions or pulses associated with data symbols. In waveform 1110, time 1112 represents a low-amplitude portion or pulse associated with the first data symbol. The low-amplitude portion is also present in ASK modulating waveform 1120 as time 1122, and is further present in the amplitude-modulated waveform 1130 as time 1132. Accordingly, the reader may time frequency transitions to occur within these low-amplitude portions or pulses. In some embodiments, the reader may identify or predict when low-amplitude portions or pulses will occur based on knowledge of the data to be transmitted and perform frequency transitions during those portions or pulses. For example, the reader may identify a low-amplitude portion or pulse within a command that it will transmit and may perform a frequency transition while transmitting the command. In this case, the reader may ensure that the average power of the RF waveform containing the entire command is sufficient for a tag to receive the command or otherwise operate without powering-down during the frequency transition. After sending the RF waveform amplitude-modulated with the command, the reader may transmit the RF waveform with no modulation to provide power for a receiving tag to complete processing the command and send a tag response, if any, backscatter-modulated onto the unmodulated RF waveform. Performing frequency switching when a transmitted, amplitude-modulated RF waveform has a relatively low amplitude reduces the amplitude of any noise components generated due to the switching.

Figure 12:
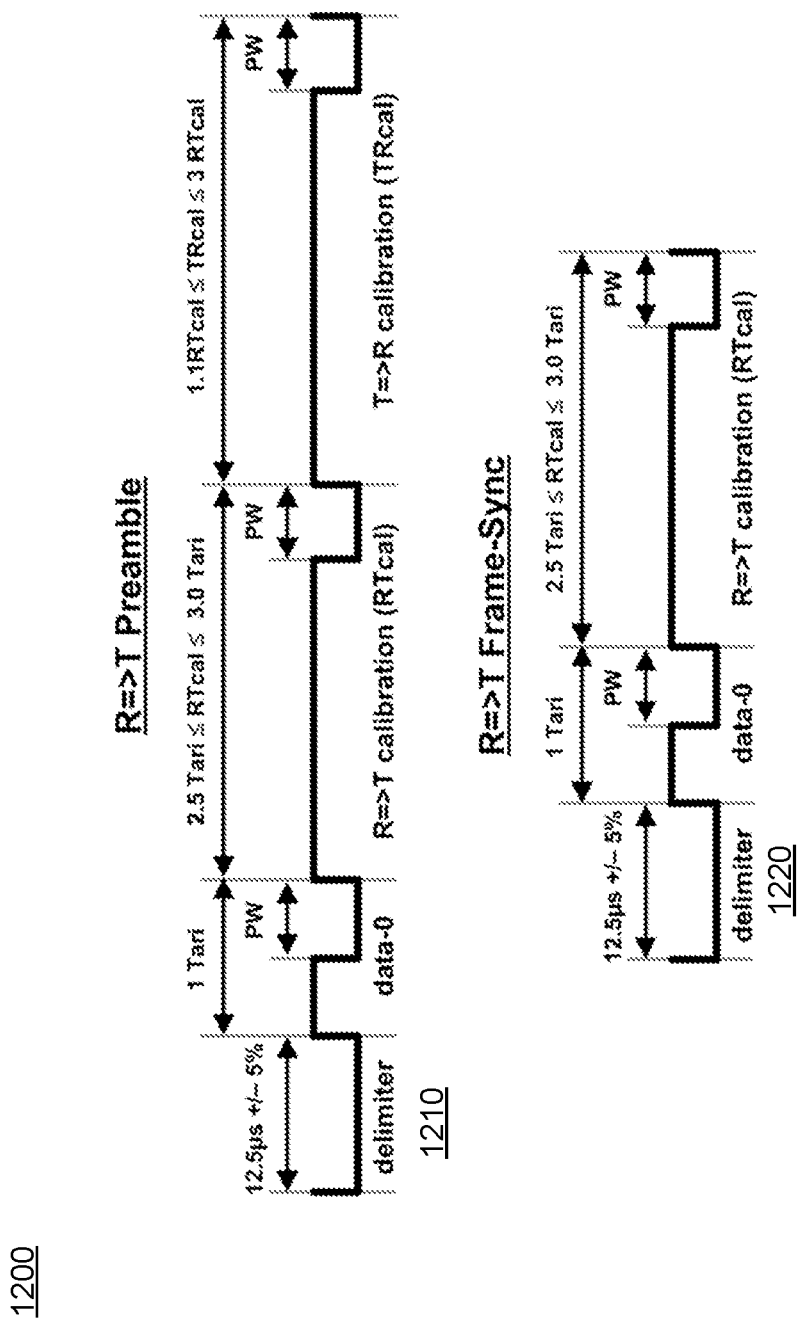
FIG. 12 depicts delimiters according to the Gen2 Specification.

As another example, a reader may also switch frequencies during transmission of a delimiter symbol. FIG. 12 depicts delimiters according to the Gen2 Specification. Diagram 1200 depicts a reader-to-tag preamble and frame-sync, as described and depicted in section 6.3.1.2.8 and FIG. 6.4 of the Gen2 Specification, respectively. The preamble and frame-sync each include a delimiter 1210 and 1220, respectively, having relatively low amplitude for a time duration of approximately 12.5 μs. In some embodiments, the reader may determine or predict when a delimiter is scheduled to be transmitted, based on knowledge of any responses to be transmitted, and perform frequency transitions during the delimiter. Of course, in other embodiments a reader may switch frequencies during transmission of any low-amplitude symbol or amplitude-modulated waveform portion, as long as the symbol or portion duration is compatible with commands and signaling in the appropriate command signaling scheme (e.g., the Gen2 Specification).

A reader may not necessarily switch frequencies only at low-amplitude portions of or pulses in a transmitted amplitude-modulated RF waveform. Instead, a reader may be able to identify and switch frequencies at other portions of or pulses in the RF waveform with amplitude and duration suitable for frequency switching. In some embodiments, the reader may be determine its frequency-switching behavior such that the resulting spectral characteristic (the waveform frequency distribution or characteristic) satisfies a threshold. For example, the reader may configure its frequency-switching behavior such that the resulting spectral characteristic satisfies a transmit mask, such as the transmit masks depicted in FIGS. 6.6 and 6.7 of the Gen2 Specification. The reader may instead configure its frequency-switching such that the resulting spectral characteristic does not interfere with nearby RF systems. In the latter situation, the reader or a controller associated with the reader may be configured to determine an appropriate spectral characteristic and adjust the reader's frequency-switching behavior appropriately.

A reader system may default to fast frequency switching behavior, or may only perform fast frequency switching in certain circumstances. In some embodiments, when a reader determines that it is to perform a frequency hop, it may determine whether any tags that it has communicated with recently will require power during the frequency hop. For example, the reader may determine that a tag is performing some lengthy or power-intensive operation, that a tag stores or maintains some state information that would be lost if power is interrupted, and/or that a tag is performing some other operation that cannot be reversibly interrupted. If the reader determines that one or more tags will require power during the frequency hop, then the reader may perform fast frequency switching. On the other hand, if the reader determines that no tags will require power during the frequency hop, then the reader may not perform fast frequency switching. In some embodiments, a reader may be configured to always perform fast frequency switching.

According to some examples, a method for an RFID reader that transmits commands to an RFID tag using amplitude modulation (AM) of a radio frequency (RF) waveform to avoid powering-down the RFID tag when changing a frequency of the RF waveform is provided. The method may include transmitting the RF waveform at a first frequency and with a first average power sufficient for the tag to receive a command modulated onto the RF waveform and modulating the RF waveform with a low-amplitude AM pulse whose duration is compatible with the command. The method may further include switching the frequency of the RF waveform to a second frequency different from the first frequency during the low-amplitude pulse and transmitting the RF waveform at the second frequency with a second average power sufficient for the tag to receive the command, at the end of the low-amplitude pulse.

According to some embodiments, the amplitude modulation is amplitude-shift keying. The low-amplitude pulse may be part of the command, and switching the frequency of the RF waveform may include switching the frequency while sending the command. The method may further include transmitting the RF waveform at the second RF frequency with no modulation after sending the command and receiving a tag response modulated onto the second-frequency RF waveform.

The first frequency may be generated using a first RF synthesizer, and the second frequency may be generated using a second RF synthesizer different from the first RF synthesizer. The method may further include tuning the second RF synthesizer to the second frequency while transmitting the RF waveform at the first frequency. In some embodiments, the first and second frequencies may be generated using a single frequency synthesizer. The command may be according to the Gen2 Specification, and the low-amplitude pulse may be a delimiter, a Tari symbol, a TRcal symbol, or an RTcal symbol, all according to the Gen2 Specification.

According to other examples, an RFID reader that transmits commands to an RFID tag using amplitude modulation (AM) of a radio frequency (RF) waveform and is configured to avoid powering-down the RFID tag when changing a frequency of the RF waveform is provided. The reader includes a transceiver configured to transmit RF waveforms and a processor coupled to the transceiver. The processor may be configured to amplitude-modulate the RF waveform with a command, where the modulation includes a low-amplitude pulse whose duration is compatible with the command, and cause the transceiver to transmit the modulated RF waveform at a first frequency and with a first average power sufficient for the tag to receive the command. The processor may be further configured to switch the frequency of the RF waveform from the first frequency to a second frequency different from the first frequency during the low-amplitude pulse and cause the transceiver to transmit the RF waveform at the second frequency with a second average power sufficient for the tag to receive the command, at the end of the pulse.

According to some embodiments, the processor may be configured to amplitude-modulate the RF waveform using amplitude-shift keying. The processor may be further configured to switch the frequency of the RF waveform while sending the command, cause the transceiver to transmit the RF waveform at the second RF frequency with no modulation after sending the command, and receive, via the transceiver, a tag response modulated onto the second-frequency RF waveform.

According to other embodiments, the reader may further include a first RF synthesizer configured to generate the first frequency, a second RF synthesizer configured to generate the second frequency while the first RF synthesizer is generating the first frequency and the transceiver is transmitting the RF waveform at the first frequency, and an RF switch coupled to the first and second RF synthesizers, where the processor is configured to switch the frequency of the RF waveform using the RF switch. In some embodiments, the reader may include a single frequency synthesizer configured to generate the first frequency prior to the low-amplitude pulse, and cease generating the first frequency during the low-amplitude pulse and instead begin generating the second frequency by at least the end of the low-amplitude pulse. The single frequency synthesizer may be a direct-digital frequency synthesizer or a fast-tuning synthesizer. The command may be according to the Gen2 Specification, and the low-amplitude pulse may be a delimiter, a Tari symbol, a TRcal symbol, or an RTcal symbol, all according to the Gen2 Specification.

According to further examples, a method for an RFID reader that transmits commands to an RFID tag using amplitude modulation of an RF waveform to avoid powering-down the RFID tag when changing a frequency of the RF waveform is provided. The method may include transmitting an RF waveform at a first frequency, where the RF waveform is amplitude-modulated with a command and identifying a modulated portion of the RF waveform whose amplitude and duration are suitable for frequency switching. The method may further include switching the frequency of the RF waveform to a second frequency different from the first frequency during the identified modulated portion and transmitting the RF waveform at the second frequency, where an average power of the entire modulated RF waveform is sufficient for the tag to receive the command.

According to some embodiments, the RF waveform may be amplitude-modulated using amplitude-shift keying. The identified modulated portion may be part of the command and switching the frequency of the RF waveform may include switching the frequency while sending the command. The method may further include transmitting the RF waveform at the second frequency with no modulation after sending the command and receiving a tag response modulated onto the second-frequency RF waveform.

The first frequency may be generated using a first RF synthesizer, and the second frequency may be generated using a second RF synthesizer different from the first RF synthesizer. The method may further include tuning the second RF synthesizer to the second frequency while transmitting the RF waveform at the first frequency. In some embodiments, the first and second frequencies may be generated using a single frequency synthesizer. The command may be according to the Gen2 Specification, and the low-amplitude pulse may be a delimiter, a Tari symbol, a TRcal symbol, or an RTcal symbol, all according to the Gen2 Specification.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A Radio-Frequency Identification (RFID) reader that transmits commands to an RFID tag using amplitude modulation (AM) of a radio frequency (RF) waveform and is configured to change a frequency of the RF waveform while transmitting commands, the reader comprising:
    a transceiver configured to transmit RF waveforms; and
    a processing block coupled to the transceiver and configured to:
        cause the transceiver to transmit the RF waveform at a first frequency;

cause the RF waveform to be amplitude-modulated with a low-amplitude pulse;

while the transceiver is transmitting the low-amplitude pulse, cause the transceiver to switch from transmitting the RF waveform at the first frequency to transmitting the RF waveform at a second frequency different from the first frequency; and after the transceiver transmits the low-amplitude pulse, cause the transceiver to continue transmitting the RF waveform at the second frequency.

2. The RFID reader of claim 1, wherein the processing block is configured to cause the RF waveform to be amplitude-modulated using amplitude-shift keying.

3. The RFID reader of claim 1, wherein the low-amplitude pulse is part of a command, and the processing block is further configured to:

cause the transceiver to switch to transmitting the RF waveform at the second frequency while sending the command;

cause the transceiver to continue transmitting the RF waveform at the second frequency with no modulation after sending the command; and receive, via the transceiver, a tag response modulated onto the RF waveform at the second frequency.

4. The RFID reader of claim 1, further comprising a first RF synthesizer and a second RF synthesizer, wherein the processing block is configured to:

cause the first frequency to be generated using the first RF synthesizer; and cause the second frequency to be generated using the second RF synthesizer.

5. The RFID reader of claim 4, wherein the processing block is further configured to cause the second RF synthesizer to be tuned to the second frequency while the transceiver is transmitting the RF waveform at the first frequency.

6. The RFID reader of claim 1, wherein the processing block is configured to cause the first and second frequencies to be generated using a single frequency synthesizer.

7. The RFID reader of claim 1, wherein the low-amplitude pulse is one of a delimiter, a Tari symbol, a TRcal symbol and an RTcal symbol, all according to the Gen2 Protocol.

8. A Radio-Frequency Identification (RFID) reader integrated circuit (IC) configured to change a frequency of a transmitted, modulated RF waveform, the IC comprising:

a processing block configured to:

cause an RF waveform to be transmitted at a first frequency;

cause the RF waveform to be amplitude-modulated with a low-amplitude pulse;

while the low-amplitude pulse is being transmitted, switch the RF waveform from being transmitted at the first frequency to being transmitted at a second frequency different from the first frequency; and after the low-amplitude pulse is transmitted, cause the RF waveform to continue being transmitted at the second frequency.

9. The RFID reader IC of claim 8, wherein the processing block is configured to cause the RF waveform to be amplitude-modulated using amplitude-shift keying.

10. The RFID reader IC of claim 8, wherein the low-amplitude pulse is part of a command, and the processing block is further configured to:

switch the RF waveform to being transmitted at the second frequency while sending the command;

cause the RF waveform to continue being transmitted at the second frequency with no modulation after sending the command; and receive a tag response modulated onto the RF waveform at the second frequency.

11. The RFID reader IC of claim 8, wherein the processing block is further configured to:

cause the first frequency to be generated using a first RF synthesizer; and cause the second frequency to be generated using a second RF synthesizer different from the first RF synthesizer.

12. The RFID reader IC of claim 11, wherein the processing block is further configured to cause the second RF synthesizer to be tuned the second frequency while the RF waveform is being transmitted at the first frequency.

13. The RFID reader IC of claim 8, wherein the processing block is further configured to cause the first and second frequencies to be generated using a single frequency synthesizer.

14. The RFID reader IC of claim 8, wherein the low-amplitude pulse is one of a delimiter, a Tari symbol, a TRcal symbol and an RTcal symbol, all according to the Gen2 Protocol.

15. A Radio-Frequency Identification (RFID) reader that transmits commands to an RFID tag using amplitude modulation (AM) of a radio frequency (RF) waveform and is configured to change a frequency of the RF waveform while transmitting commands, the reader comprising:

a transceiver configured to transmit RF waveforms; and a processing block coupled to the transceiver and configured to:

cause the RF waveform to be amplitude-modulated with a command;

cause the transceiver to transmit the modulated RF waveform at a first frequency;

identify a modulated portion of the RF waveform whose amplitude and duration are suitable for frequency switching;

while the transceiver is transmitting the modulated portion, cause the transceiver to switch from transmitting the RF waveform at the first frequency to transmitting the RF waveform at a second frequency different from the first frequency; and after the transceiver transmits the modulated portion, cause the transceiver to continue transmitting the RF waveform at the second frequency.

16. The RFID reader of claim 15, wherein the processing block is configured to cause the RF waveform to be amplitude-modulated using amplitude-shift keying.

17. The RFID reader of claim 15, wherein the identified modulated portion is part of the command, and the processing block is further configured to:

cause the transceiver to switch to transmitting the RF waveform at the second frequency while sending the command;

cause the transceiver to continue transmitting the RF waveform at the second frequency with no modulation after sending the command; and receive, via the transceiver, a tag response modulated onto the second-frequency RF waveform.

18. The RFID reader of claim 15, further comprising a first RF synthesizer and a second RF synthesizer, wherein the processing block is configured to:

cause the first frequency to be generated using the first RF synthesizer; and cause the second frequency to be generated using the second RF synthesizer.

19. The RFID reader of claim 18, wherein the processing block is further configured to cause the second RF synthesizer to be tuned to the second frequency while the transceiver is transmitting the RF waveform at the first frequency.

20. The RFID reader of claim 15, wherein the modulated portion is one of a delimiter, a Tari symbol, a TRcal symbol, and an RTcal symbol, all according to the Gen2 Protocol.

* * * * *